United States Patent [19]

Pabst

[11] Patent Number: 4,498,248
[45] Date of Patent: Feb. 12, 1985

[54] METHOD AND DEVICE FOR CONTROLLING A CONTINUOUS HEAT TREATMENT OF A TEXTILE FABRIC WEB

[75] Inventor: Manfred Pabst, Cologne, Fed. Rep. of Germany

[73] Assignee: A. Monforts GmbH & CO., Monchen- Gladbach, Fed. Rep. of Germany

[21] Appl. No.: 416,085

[22] Filed: Sep. 8, 1982

[30] Foreign Application Priority Data

Sep. 8, 1981 [DE] Fed. Rep. of Germany ....... 3135473
Dec. 8, 1981 [DE] Fed. Rep. of Germany ....... 3148576

[51] Int. Cl.³ .............................................. F26B 21/00
[52] U.S. Cl. .......................................... 34/89; 34/43; 34/46; 34/48; 34/155
[58] Field of Search ...................... 68/5 D, 5 E; 34/44, 34/45, 48, 54, 89, 155, 160, 43, 46

[56] References Cited

U.S. PATENT DOCUMENTS 3,800,565 4/1974 Worth et al. .......................... 68/5 D
4,204,337 5/1980 Roos et al. .............................. 34/44

Primary Examiner—Larry I. Schwartz
Attorney, Agent, or Firm—Herbert L. Lerner; Laurence A. Greenberg

[57] ABSTRACT

Method of controlling the continuous convective heat treatment of a textile fabric web, which includes continuously remotely monitoring the temperature of a web being transported over a path in a given direction, directing heated air toward the web, and measuring the amount of heat given off to the web, which is proportional to the temperature of the web, as a function of the difference between the temperature of the air impinging on the web and the temperature of the air reflected by the web.

18 Claims, 3 Drawing Figures

LENGTH OF THE HEAT TREATMENT INSTALLATION

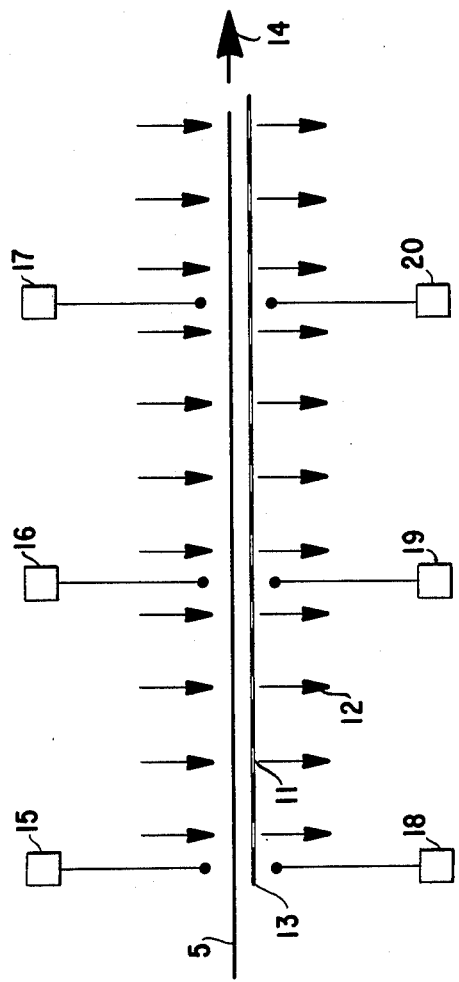

METHOD AND DEVICE FOR CONTROLLING A CONTINUOUS HEAT TREATMENT OF A TEXTILE FABRIC WEB

The invention relates to a method for controlling the continuous convective heat treatment of a textile fabric web or cloth layer, especially during drying, finishing, fixing, dyeing or the like, wherein the temperature of the web is continuously monitored remotely or without contact. Furthermore, the invention relates to a device for performing the method.

A method of this kind can be learned about from an article in the magazine "Melliand Textilberichte" August/1965, Page 887, right column, which relates to the drying of moist fabrics. According to this Publication, it is possible to observe under uniform drying conditions that the temperature of fabrics remains approximately constant until a different specific critical residual moisture is reached for each fiber type. When this temperature is reached, the drying speed is noticable reduced and a steady rise of the fabric temperature can be observed. Then, when the goods are completely dry, and no energy is used to evaporate water, the authors observed that the temperature should remain approximately constant. Furthermore, they explain that, with respect to the indication of the critical residual moisture based on the beginning of a uniform temperature rise, it is easier to measure a temperature change than a diminishing moisture content. Accordingly, it is known in the art to continuously measure the temperature of the goods, directly but without contact, by means of temperature sensors, such as radiation pyrometers.

A temperature profile or curve is therefore to be prepared along the length of the treatment route within a respective machine, such as within a tensioning frame, a hot air sieve/drum or wire mesh drum, or a wire mesh conveyor band. In this case, depending on the respective requirements, the above-mentioned temperature rise, noted by a bend or kink in the temperature curve, is always located at a different position along the length of the treatment path. It therefore becomes necessary to place temperature sensors along this path in an apparatus which allows the recognition of this "temperature kink" at any location. Since remote reading and generally applicable temperature sensors, such as radiation pyrometers, are very costly, the control of a continuous convective heat treatment could only be provided in a very limited form. It should be taken into consideration that this control by adapting the temperature profile of the respective installation to the respective treatment objective saves energy, and the costs required for the control are obviously compensated by the energy saving achieved. Therefore, temperature measuring devices for heat treatment machines, such as tensioning or tentering frames have been developed, which operate on a more simple principle, but which do not function without contacting the fabric. This should be compared to an article in the magazine "Textilbetrieb", April 1981, Page 55. In such devices, the temperature in the boundary layer of the goods which are to be controlled is measured.

Since a fluttering of the goods in the heat treatment apparatus, such as tentering frames or hot air installations (hotflues) cannot be avoided, and the thickness of the layer suitable for the measurement is only a view millimeters, contact between the measuring instrument and the goods cannot be avoided. For this reason, the measuring instrument is coacted with a friction reducing plastic at the side which faces the goods. However, since even if the friction is very small, it leads to markings during the treatment of many fabric webs, this type of an instrument can only be used in special cases, in actual practice.

It is accordingly an object of the invention to provide a method and device for controlling the continuous heat treatment of a textile fabric web, which overcomes the hereinafore-mentioned disadvantages of the heretofore-known methods and devices of this general type, to determine the process behavior and to control the transport speed in a device for the continuous, convective heat treatment of a textile fabric web, to provide measurement results which are sufficiently accurate to be used in industrial practice, to permit the control and/or regulation of the respective parameters based on the measuring results, and to carry out these objectives at a cost which is fully compensated by the savings in energy and production time.

With the foregoing and other objects in view there is provided, in accordance with the invention, a method of controlling the invention convective heat treatment of a textile fabric web or cloth layer, especially during drying, finishing, fixing, dueing or the like, which comprises continuously remotely monitoring without contact the temperature of a web being transported or conveyed over a path in a given direction, directing or blowing heated air towards or through the web, and measuring the amount of heat given off to the web, which is proportional to the temperature of the web, as a function of the difference between the temperature of the air impiniging on the web and the temperature of the air reflected by or having passed through the web.

In accordance with another mode, the method of the invention comprises directing the heated air at least partially parallel to or across the given transport direction of the web.

In accordance with a further mode, the method of the invention comprises directing the heated air at least partially across the given transport direction of the web.

In accordance with an additional mode, the method of the invention comprises setting a position at which the web reaches a desired temperature and required exposure time for the treatment operation relative to the distance from an outlet region of the web transport path to which the heated air is applied.

In accordance with an added mode, the method of the invention comprises introducing the web in a moist state for drying, and maintaining a temperature difference corresponding to a given residual moisture by regulating the transport speed of the web at an outlet region of the web transport path.

In accordance with yet another mode, the method of the invention comprises simultaneously drying and fixing the web while setting a temperature difference corresponding to a suitable residual moisture for fixing by regulating the transport speed of the web at a location spaced at a distance from an outlet region of the transport path corresponding to the exposure time for fixing after drying.

In accordance with yet a further mode, the method of the invention comprises determining temperature differences at least at two points positioned along the web transport path in sequence or adjacent to each other, and regulating the transport speed of the web in a region of substantially constant temperature differences for setting a distance from an outlet region of the web transport path corresponding to a required exposure time for fixing.

In accordance with yet an additional mode, the method of the invention comprises regulating the transport speed during drying or combined drying and fixing in the outlet region.

Thus, the term "air" stands for each suitable treatment gas. In accordance with the invention, for carrying out the method, there is provided an apparatus for controlling the continuous convective heat treatment of the textile fabric web, comprising a plurality of nozzles disposed in zones sequentially along a web transport path, the nozzles having nozzle outflow channels adjacent the web for directing heated air toward or through the web and nozzle return flow channels adjacent the web for removing air, a first measuring sensor disposed directly in each of the nozzle outflow channels for remotely performing measurements for each temperature difference of the web along or across the transport path, and a second measuring sensor disposed directly in each of the nozzle return flow channels for measuring the amount of heat given off to the web, which is proportional to the temperature of the web, as a function of the difference between the temperature of the air impinging on the web and the temperature of the air reflected by or having passed through the web. A device of this kind can be provided in the form of a tentering frame or a hotflue.

In accordance with yet an added feature of the invention, the heated air is directed in a given air flow direction, one of the first measuring sensors are disposed upstream of the web and one of the second measuring sensors are disposed downstream of the web, in the given air flow direction, for each of the temperature difference measurements along or across the web transport path.

Accordingly, in the method according to the invention, the amount of heat given off to the fabric web, which in fact is proportional to the temperature difference between the incoming air and the temperature of the goods, is determined as a function of the temperature difference between the incoming air and the reflected or passed through return air. Furthermore, since the temperature of the air which is blown onto the goods can be assumed to be constant, or at least as directly measurable, the measurement according to the invention, which is a measurement of the heat energy given off to the goods, provides a heat profile or curve corresponding to the temperature of the goods itself, especially if the measurements are made at several locations in sequence along the transport path.

Since only air thermometers or thermo-elements are required for controlling the continuous convective heat treatment according to the invention, the installation costs are so low, that the installation of the devices at several sequential stations along the transport path of the fabric web is fully compensated by the gain in energy savings during the operation of the machine.

Other features which are considered as characteristic for the invention are set forth in the appended claims.

Although the invention is illustrated and described herein as embodied in method and device for controlling a continuous heat treatment of a textile fabric web, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is a cross-sectional view of a part of a wire cloth system.

Figure 1:
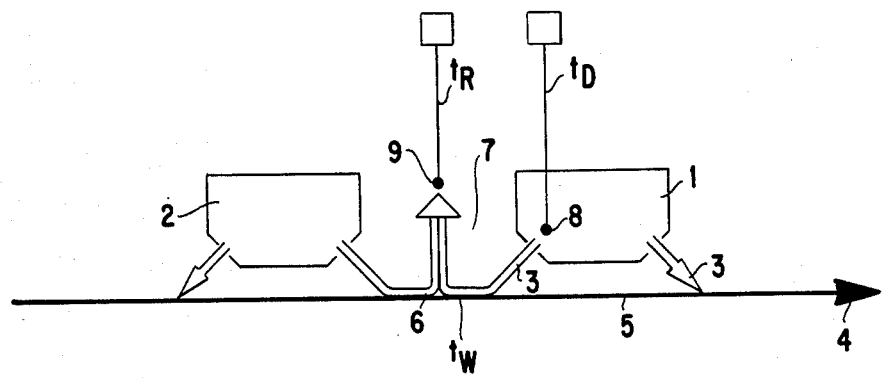
FIG. 1 is a diagrammatic cross-sectional view of a part of a tension frame nozzle system.

Referring now to the figures of the drawing and first particularly to FIG. 1 thereof, there is seen a cross section through only two blower boxes 1 and 2 of a tension frame. The blower boxes blow air or some other heated treatment gas in the direction of an arrow 3 onto the textile web 5 which moves in the direction of an arrow 4. The heated air which flows from the interior of the blower boxes 1 and 2 in the direction of the arrow 3 is reflected at the web or cloth layer 5, and flows away in the direction of an arrow 6 in a return flow channel 7 which is disposed between each pair of blower boxes 1 and 2. Depending on the temperature difference between the temperature $t_D$ of the inflowing gas and the temperature of the web 5, the inflowing gas gives off a certain amount of heat Q to the goods, and flows with the reduced temperature $t_R$ of the return gas in the direction of the arrow 6 away from the web again. As explained hereinafore, the temperature difference between the inflowing gas and the returning gas i.e.:

$$\Delta t_L = t_D - t_R,$$

is proportional to the heat quantity Q which was given off from the heated gas to the web 5. Since this heat quantity Q is theoretically proportional to the difference between the temperature $t_D$ of the inflowing gas and the temperature $t_W$ of the goods, and since the temperature $t_D$ can be assumed to be constant or known, the temperature $t_W$ can be directly found from the temperature difference $\Delta t_L$ using a proportionality factor, so that $$\Delta t_L \sim t_W$$

holds for a fixed temperature $t_D$.

If thermometers 8 and 9 are disposed at suitable locations directly in the nozzle box 1 and in the return flow channel 6, and are set to measure the temperature difference $t_L = t_D - t_R$, the temperature $t_W$ of the goods can be directly found at the respective position from the value $\Delta t_L$, except for a proportionality factor. If additional thermometer pairs 8 and 9 are disposed along the length of the conveyor route of the web 5 at the outlet of the blower box and the entrance of the return channel, it becomes possible to measure temperature profiles, as shown graphically in FIG. 2.

Figure 2:
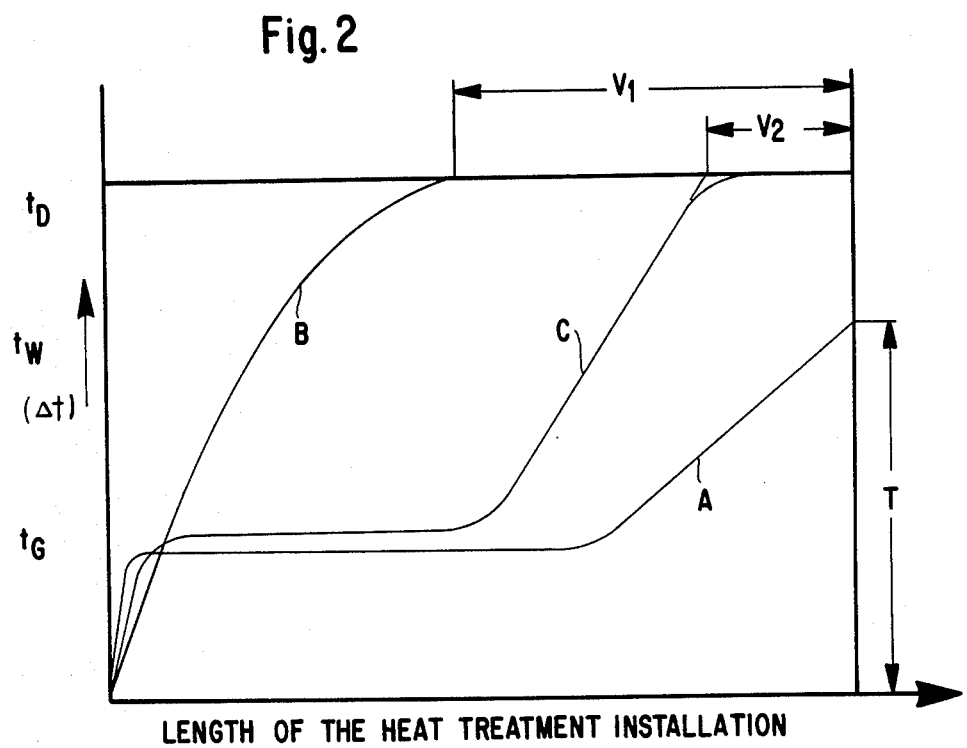
FIG. 2 is a diagram of the temperature curve along the length of the conveying route in a heat treatment installation.

In FIG. 2, the behavior of the temperature $t_W$ of the web or cloth layer 5 over its path or over the length of its route in the respective heat treatment installation, is represented for various cases. It is assumed in such cases that the air flowing from the blower box 1, 2 onto the web 5 has a constant temperature $t_D$. Therefore, the temperature of the goods cannot be higher than $t_D$. If a previously wetted textile web is fed into the system for the sole purpose of drying, the temperature profile has the shape of a curve A in principle. However, if only goods which have already been dried have to be fixed or set, the curve B applies. The most common case in practice is that the goods must be simultaneously dried and fixed. The corresponding temperature profile is indicated in FIG. 2 by the curve C.

If only the drying of a wet material is required, after the goods or material are conveyed into the respective machine, a heating process up to the so-called cool-limit temperature $t_G$ is initiated. This temperature remains constant while the moisture contained in the goods slowly evaporates until a critial residual moisture level is reached. When the cirtical residual moisture level is reached, the temperature curve exhibits a band showing a temperature increase thereafter. After becoming acquainted with the bend in the temperature curve and the following temperature increase, and after having determined them according to the invention, it is possible to adjust the conveyor speed of the goods in the respective drying apparatus in such a manner that the goods will have reached a predetermined degree of dryness T when it leaves the apparatus.

In contrast thereto, if the requirement is only to fix a web of goods which is already dry at a relative high temperature $t_D$, the temperature $t_W$ of the goods rises very rapidly along the curve B almost up to the temperature $t_D$ of the inflowing gas, due to the fact that there is no moisture. The goods are then to be fixed at this fixing temperature for a certain exposure time $V_1$, perhaps for a few seconds. According to the invention it is possible to exactly determine the reaching of the fixing temperature, and to adjust the transport velocity of the respective machine in such a way that the goods are kept at the fixing temperature for exactly the required exposure time. In contrast to this, if it is not possible to determine exactly when the fixing temperature is reached, such as if the effort to determine this parameter is too great, the transport velocity of the machine must be adjusted in such a way that the required exposure time is elapsed in any case. Therefore, in order to be sure the operation has frequently been performed with exposure times that are too long, and a correspondingly considerable energy and production loss.

Especially difficult problems in the measuring technique have been encountered when it has been a requirement to dry and fix a web which contained moisture. This is because the region of the temperature rise after the bend in the temperature curve at the end of the cool limit temperature range varies or moves considerably, depending on the degree of moisture content, the weight of the goods, the type of material and the like. To determine or locate the bend at the end of the cool limit temperature level, and the bends in the temperature curve after almost reaching the fixing temperature which is almost the same as the temperature $t_D$, it is required to determine numerous measuring points along the length of the transport path, to find the temperature defference $\Delta t_L$, which corresponds to the temperature $t_W$ of the goods. For this purpose it is required to use an apparatus having a scanning area or raster which is so small that the bend at the beginning of the fixing temperature can be exactly determined on the temperature curve, and can be regulated in such a way that the remaining exposure time in the machine is sufficient to fix the web of goods in the respective machine. Since the cost per unit measure is very low in the method according to the invention, as compared with known devices, the advantage of the invention becomes especially obvious in this case. This is because inspite of the required numerous number of measuring positions, the energy saving and productivity increase by far outweights the cost of executing the method according to the invention.

In principle, the same method used for the tension or tentering frame nozzle system applied also for using the invention on hole, wire mesh or drum-type machines for drying, fixing or the like. According to FIG. 3, the web 5 is therefore transported in direction of the web transport 14 on a conveyor belt 13 which has holes 11 formed therein for air flow in a direction 12, and the web is simultaneously exposed to treatment gas which flows approximately perpendicularly to the transport direction 14 and the plane of the web, in the direction 12. Thermometers 15 to 17 and 18 to 20, respectively, serve for measuring the temperature before and after reaching the web 5. If there are enough thermometer pairs disposed along the length of the treatment route, a temperature profile can also be established in this case, according to FIG. 2. The drawing of FIG. 3 relates to a wire mesh band system with a flat band. However, the flat band can also be thought of as the projected surface of a drum system with holes.

If, in the system according to FIG. 1 or 3, the temperature profile is to be measured across the web transport direction instead of parallel to the direction of the web transport, it is necessary to adapt the air admission and air removal by suction applied to the web in such a manner that a temperature plateau is formed having the same temperature over the whole width of the web.

There are claimed:

1. Apparatus for sensing the continuous convective heat treatment of a textile fabric web, comprising a plurality of nozzles disposed in zones sequentially at a web transport path, said nozzles having nozzle outflow channels adjacent the web for directing heated air toward the web and nozzle return flow channels adjacent the web for removing air, a first measuring sensor disposed directly in each of said nozzle outflow channels for remotely performing measurements for each temperature difference of the web at the transport path, and a second measuring sensor disposed directly in each of said nozzle return flow channels for measuring the amount of heat given off to the web, which is proportional to the temperature of the web, as a function of the difference between the temperature of the air impinging on the web and the temperature of the air reflected by the web.

2. Apparatus according to claim 1, wherein said heated air is directed in a given air flow direction, one of said first measuring sensors are disposed upstream of the web and one of said second measuring sensors are disposed downstream of the web, in said given air flow direction, for each of said temperature difference measurements along the web transport path.

3. Apparatus according to claim 1, wherein said nozzle boxes are disposed along the web transport path.

4. Apparatus according to claim 1, wherein said nozzle boxes are disposed across the web transport path.

5. Apparatus for sensing the continuous convective heat treatment ofa textile fabric web, comprising a plurality of nozzles disposed in zones sequentially at a web transport path, said nozzles having nozzle outflow channels adjacent the web for directing heated air through the web and nozzle return flow channels adjacent the web for removing air, a first measuring sensor disposed directly in each of said nozzle outflow channels for remotely performing measurements for each temperature difference of the web at the transport path, and a second measuring sensor disposed directly in each of said nozzle return flow channels for measuring the amount of heat given off to the web, which is proportional to the temperature of the web, as a function of the difference between the temperature of the air impinging on the web and the temperature of the air having passed through the web.

6. Apparatus according to claim 5, wherein said heated air is directed in a given air flow direction, one of said first measuring sensors are disposed upstream of the web and one of said second measuring sensors are disposed downstream of the web, in said given air flow direction, for each of said temperature difference measurements across the web transport path.

7. Apparatus according to claim 5, wherein said nozzle boxes are disposed along the web transport path.

8. Apparatus according to claim 5, wherein said nozzle boxes are disposed across the web transport path.

9. Apparatus for sensing the continuous convective heat treatment of a textile fabric web, comprising a plurality of nozzle boxes having outlet nozzles disposed therein in zones sequentially at a web transport path, said nozzle boxes defining nozzle outflow channels adjacent the web for directing heated air toward the web and nozzle return flow channels with inlets adjacent the web and adjacent said outlet nozzles for removing air, a first measuring sensor disposed directly at each of said outlet nozzles for measuring the temperature of air impinging on the web at the transport path, and a second measuring sensor disposed directly at each of said inlets of said nozzle return flow channels for measuring the temperature of air reflected by the web, in order to determine the difference between the temperature of air impinging on the web and air reflected by the web in said zones.

10. Apparatus according to claim 9, wherein said nozzle boxes are disposed along the web transport path.

11. Apparatus according to claim 9, wherein said nozzle boxes are disposed across the web transport path.

12. Apparatus for sensing the continuous convective heat treatment of a textile fabric web, comprising a plurality of nozzle boxes having outlet nozzles disposed therein in zones sequentially at a web transport path, said nozzle boxes defining nozzle outflow channels adjacent the web for directing heated air through the web and nozzle return flow channels with inlets adjacent the web and adjacent said outlet nozzles for removing air, a first measuring sensor disposed directly at each of said outlet nozzles for measuring the temperature of air impinging on the web at the transport path, and a second measuring sensor disposed directly at each of said inlets of said nozzle return flow channels for measuring the temperature of the air having passed through the web, in order to determine the difference between the temperature of air impinging on the web and air having passed through the web.

13. Apparatus according to claim 12, wherein said nozzle boxes are disposed along the web transport path.

14. Apparatus according to claim 12, wherein said nozzle boxes are disposed across the web transport path.

15. Apparatus for sensing the continuous convective heat treatment of a textile fabric web, comprising means for blowing heated air through the fabric web in a given air flow direction at given measurement locations, at least one first sensor disposed upstream of the fabric web in said given air flow direction for measuring the temperature of air impinging on the fabric web, and at least one second sensor disposed downstream of the fabric web in said given air flow direction for measuring the temperature of air after it has passed through the fabric web, in order to determine the difference between the temperature of the air impinging on the fabric web and the temperature of the air having passed through the fabric web at said given measurement locations.

16. Apparatus according to claim 15, wherein the fabric web is transported in a given transport direction, and said first and second sensors are in the form of a plurality of first and second sensors disposed substantially along said given transport direction.

17. Apparatus according to claim 15, wherein the fabric web is transported in a given transport direction, and said first and second sensors are in the form of a plurality of first and second sensors disposed substantially across said given transport direction.

18. Apparatus according to claim 15, wherein the fabric web is transported in a given transport direction, and said first and second sensors are in the form of a plurality of first and second sensors disposed substantially along and across said given transport direction.

* * * * *